United States Patent
Ikeo

(10) Patent No.: US 10,845,686 B2
(45) Date of Patent: Nov. 24, 2020

(54) PHOSPHOR WHEEL, AND PHOSPHOR WHEEL DEVICE, LIGHT CONVERSION UNIT, AND PROJECTION DISPLAY APPARATUS, EACH PROVIDED WITH PHOSPHOR WHEEL

(71) Applicant: Panasonic Intellectual Property Management Co., Ltd., Osaka (JP)

(72) Inventor: Kenji Ikeo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/530,219

(22) Filed: Aug. 2, 2019

(65) Prior Publication Data
US 2019/0353993 A1 Nov. 21, 2019

Related U.S. Application Data

(63) Continuation of application No. PCT/JP2018/006975, filed on Feb. 26, 2018.

(30) Foreign Application Priority Data

Feb. 28, 2017 (JP) ................................ 2017-036152

(51) Int. Cl.
*G03B 21/16* (2006.01)
*G03B 21/20* (2006.01)
(Continued)

(52) U.S. Cl.
CPC ........... *G03B 21/16* (2013.01); *G02B 26/008* (2013.01); *G03B 21/204* (2013.01); *G03B 21/008* (2013.01); *G03B 33/12* (2013.01)

(58) Field of Classification Search
CPC ..... G03B 21/204; G03B 21/16; H04N 9/3144; H04N 9/3158
See application file for complete search history.

(56) References Cited

U.S. PATENT DOCUMENTS

2012/0013854 A1* 1/2012 Nishimura ............. G03B 21/16
353/57
2013/0169938 A1 7/2013 Huang et al.
(Continued)

FOREIGN PATENT DOCUMENTS

JP  62-170301  10/1987
JP  2016-53608  4/2016
(Continued)

OTHER PUBLICATIONS

International Search Report dated Mar. 20, 2018 in International (PCT) Application No. PCT/JP2008/006975.

*Primary Examiner* — Ryan D Howard
(74) *Attorney, Agent, or Firm* — Wenderoth, Lind & Ponack, L.L.P.

(57) ABSTRACT

A phosphor wheel (13) includes: a first surface having a disk shape; a second surface opposite the first surface; a phosphor layer (13b) having an annular shape and being provided on the first surface; a plurality of openings (13c); and a plurality of first blade parts (33a). The plurality of openings (13c) are disposed radially inward of the annular-shaped phosphor layer (13b) and arrayed along a circumferential direction. The plurality of first blade parts (33a) are located respectively adjacent to the plurality of openings (13c) in the first surface and configured to blow air to a surface of the phosphor layer (13b).

10 Claims, 22 Drawing Sheets

(51) Int. Cl.
*G02B 26/00* (2006.01)
*G03B 21/00* (2006.01)
*G03B 33/12* (2006.01)

(56) References Cited

U.S. PATENT DOCUMENTS

2015/0009685 A1 1/2015 Wang et al.
2016/0069558 A1 3/2016 Hu et al.
2016/0077326 A1 3/2016 Yamagishi et al.
2017/0010523 A1 1/2017 Egawa

FOREIGN PATENT DOCUMENTS

| JP | 2016-66061 | 4/2016 |
| JP | 2016-524271 | 8/2016 |
| JP | 2017-21207 | 1/2017 |

\* cited by examiner

PHOSPHOR WHEEL, AND PHOSPHOR WHEEL DEVICE, LIGHT CONVERSION UNIT, AND PROJECTION DISPLAY APPARATUS, EACH PROVIDED WITH PHOSPHOR WHEEL

TECHNICAL FIELD

The present disclosure relates to a phosphor wheel. The present disclosure also relates to a phosphor wheel device, a light conversion unit, and a projection display apparatus that are provided with the phosphor wheel.

BACKGROUND ART

A known type of projection display apparatus uses a laser diode as a light source. The light produced from the light source excites phosphors, so that the projection display apparatus utilizes the fluorescence light emitted from the phosphors. Considering the temperature characteristics for the light conversion efficiency of the phosphor itself and the heat resistance performance of a binder that is used for forming the phosphor on a substrate, the phosphor needs to be prevented from undesirable temperature increases.

For that purpose, a phosphor layer is formed on a disk substrate, which is attached to a motor to rotate the disk substrate so that a portion that emits fluorescent light can be rotated at all times to prevent the phosphor from undesirable temperature increases.

For example, Patent Literature (PTL) 1 discloses a phosphor wheel that includes a plurality of openings arranged along a circumferential direction, and fan blades disposed adjacent to the openings and provided on a surface opposite a surface on which a phosphor layer is provided.

CITATION LIST

Patent Literature

PTL 1: U.S. Patent Application Publication No. 2013/0169938

PTL 2: Japanese Patent Unexamined Publication No. 2016-053608

PTL 3: Japanese Utility Model Unexamined Publication No. S62-170301

SUMMARY

The above-described conventional phosphor wheel, however, has issues such as described below.

Specifically, the brightness of projection display devices has increased in recent years, and the intensity of excitation light has increased accordingly, which tends to result in insufficient cooling performance. For that reason, a sufficient cooling effect cannot be obtained by the phosphor wheel as disclosed in the above-mentioned publication.

An object of the present disclosure is to provide a phosphor wheel that is able to improve the cooling effect as compared to conventional phosphor wheels, and to provide a phosphor wheel device, a light conversion unit, and a projection display apparatus that are provided with the phosphor wheel.

A phosphor wheel according to the present disclosure includes a first surface having a disk shape, a second surface opposite the first surface, a phosphor layer having an annular shape and being provided on the first surface, a plurality of openings, and a plurality of first blade parts. The plurality of openings are disposed radially inward of the annular-shaped phosphor layer and arrayed along a circumferential direction. The plurality of first blade parts are located respectively adjacent to the plurality of openings in the first surface, and the plurality of first blade parts blow air to a surface of the phosphor layer.

The phosphor wheel according to the present disclosure is able to obtain an improved cooling effect over conventional phosphor wheels.

DESCRIPTION OF EMBODIMENTS

Hereinbelow, exemplary embodiments will be described in detail with reference to the drawings. However, unnecessarily detailed description may be omitted. For example, detailed description of well-known matters and repetitive description of substantially the same structures may be omitted. This is to prevent the following description from becoming redundant and to facilitate understanding for those skilled in the art.

It should be noted that the applicant provides the appended drawings and the following description in order that those skilled in the art will be able to sufficiently understand the present disclosure, and the appended drawings and the following description are not intended to limit the subject matter set forth in the claims.

Exemplary Embodiment

A phosphor wheel device incorporating a phosphor wheel according to an exemplary embodiment of the present disclosure, a light conversion unit, and projector (projection display apparatus) 100 will be described below with reference to FIGS. 1 to 11.

Configuration of Projector 100

Figure 1:
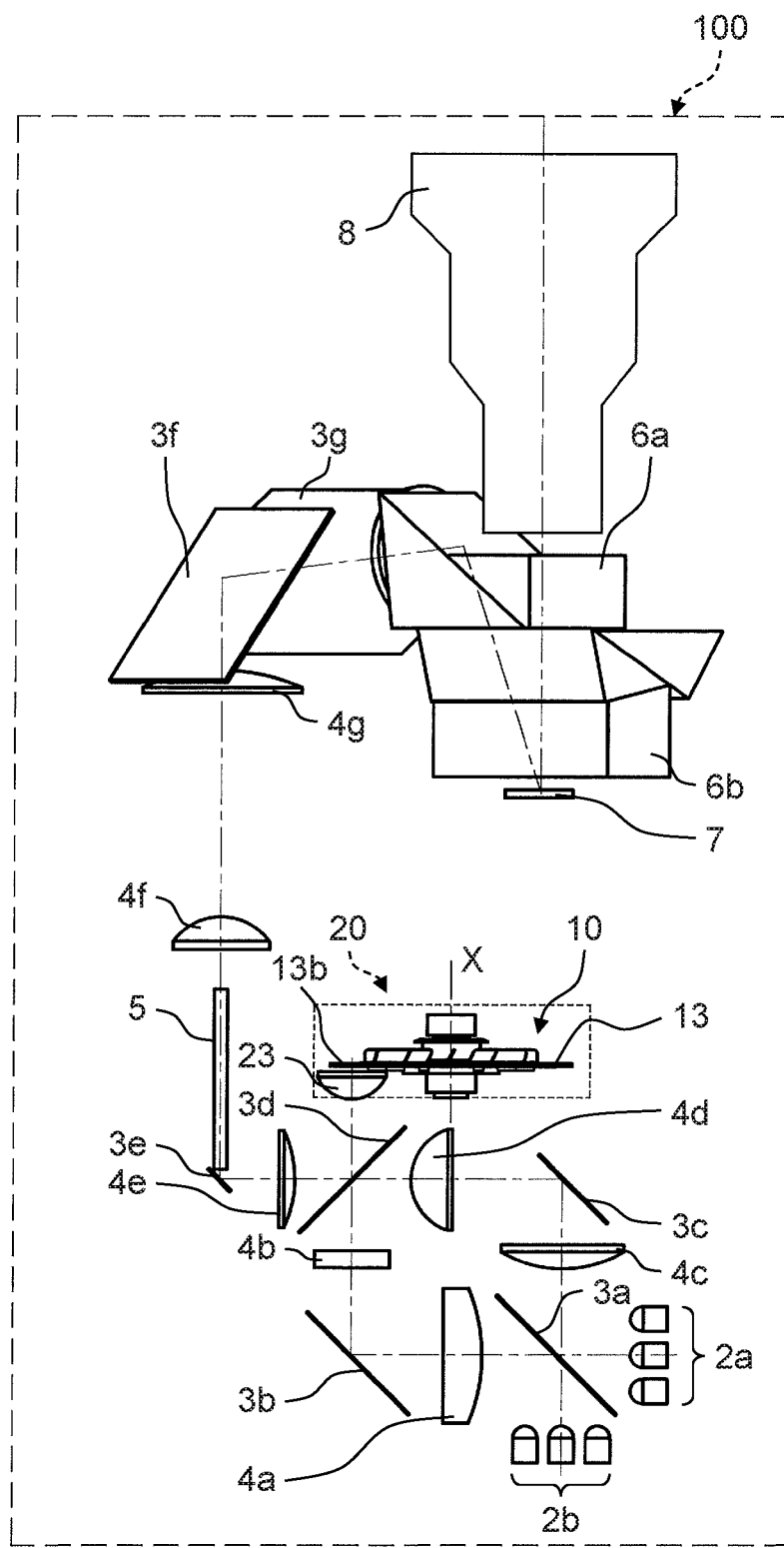
FIG. 1 is a schematic view illustrating a projection display apparatus according to an exemplary embodiment of the present disclosure.

FIG. 1 is a schematic view illustrating a projection display apparatus according to an exemplary embodiment of the present disclosure. Projector (projection display apparatus) 100 is a digital light processing (DLP) type video display device that incorporates one spatial light modulator, such as digital mirror device (DMD) (display element) 7. Projector 100 includes blue laser diodes (LDs) 2a and 2b (light sources), various types of optical components, and light conversion unit 20 including phosphor wheel device 10 that emits fluorescent light exited by laser light.

It should be noted that although projector 100 of the present exemplary embodiment employs 3-chip DLP system that incorporates three DMDs 7, which respectively correspond to three primary colors R, G, and B, only one DMD 7 is shown in FIG. 1 for convenience in illustration.

As illustrated in FIG. 1, projector 100 of the present exemplary embodiment includes: two blue LDs 2a and 2b as the light sources; optical components including separating mirror 3a, mirrors 3b and 3c, dichroic mirror 3d, mirrors 3e, 3f, and 3g, lenses 4a to 4g, rod integrator 5, total internal reflection (TIR) prism 6a, color prism 6b, DMD 7, and projection lens 8; and light conversion unit 20.

Blue LDs 2a and 2b are the light sources of projector 100, and each set of blue LDs 2a and 2b is configured to include a plurality (m×n) of LDs vertically and horizontally. Blue LDs 2a and blue LDs 2b are arranged perpendicularly to each other. Accordingly, the light emanating from blue LDs 2a and 2b travels in directions perpendicular to each other.

Separating mirror 3a is provided in the vicinity of an intersection point at which the laser light emanating from two blue LDs 2a and 2b intersect with each other, to separate the laser light emanating respectively from blue LDs 2a and 2b in two directions.

Mirrors 3b and 3c convert the traveling directions of the laser lights that are separated by separating mirror 3a, which travel in two directions, 90 degrees.

Dichroic mirror 3d, which is made of a special optical material, reflects light of specific wavelengths and transmits light of other wavelengths. In the present exemplary embodiment, dichroic mirror 3d transmits the blue laser light emanating from blue LDs 2a and 2b and reflects red light and green light that are converted by later-described phosphor wheel device 10 from the blue laser light.

Mirrors 3e, 3f, and 3g guide the lights of three primary colors R, G, and B that have transmitted through or reflected on dichroic mirror 3d toward projection lens 8, which is disposed at the most downstream end.

Lens 4a to 4g condense or collimate the blue laser light emanating from blue LDs 2a and 2b as the light sources and the red light and the green light converted by phosphor wheel device 10 from the blue laser light.

Rod integrator 5 uniformizes the illuminance of the incident light. The light entering into rod integrator 5 undergoes total internal reflection repeatedly at the inner circumferential surface of rod integrator 5, and emanates from rod integrator 5 with a uniform illuminance distribution at the exit surface. Rod integrator 5 is provided at a position on which the light reflected on mirror 3e is incident.

TIR prism 6a converts the traveling direction of entering light by utilizing total internal reflection.

Color prism 6b separates the entering light into three primary colors R, G, and B and causes the respective lights to reflect on three DMDs 7, which correspond to the respective colors, disposed at a downstream end.

Three DMDs 7 are provided so that each of them corresponds to one of three primary colors, R, G, and B. DMDs 7 modulates the entering light with a video signal and emits the modulated light through color prism 6b to projection lens 8.

Projection lens 8 is disposed at the most downstream end of the optical components incorporated in projector 100. Projection lens 8 magnifies and projects the entering light through TIR prism 6a, DMDs 7, and color prism 6b onto a screen, which is not shown in the drawings.

Light conversion unit 20 is a device for converting the blue light emitted from later-described blue LDs 2a and 2b into red light and green light by using phosphors. Light conversion unit 20 includes phosphor wheel device 10. It should be noted that the configuration of light conversion unit 20 including phosphor wheel device 10 will be described in detail later.

Projection of Video Images by Projector 100

The laser lights emanating from two blue LDs 2a and 2b is split into two directions by separating mirror 3a disposed in the vicinity of the intersection point of the two laser lights.

Of them, the first blue laser light passes through lens 4c, mirror 3c, and lens 4d, and transmits through dichroic mirror 3d. Subsequently, after passing through lens 4e, the first blue laser light reflects on mirror 3e in a 90-degree direction and then enters rod integrator 5.

The second blue laser light passes through lens 4a, mirror 3b, and lens 4b, and transmits dichroic mirror 3d. Then, the second blue laser light is applied to phosphor layer 13b of phosphor wheel 13 of phosphor wheel device 10. At this time, the second blue laser light excites a red phosphor and a green phosphor in phosphor layer 13b so that it is converted into red light and green light.

At this time, because phosphor wheel 13 is rotated by motor 14 (see FIG. 2), it is possible to prevent the burn-in that is caused when the red phosphor and the green phosphor are irradiated with the blue laser light.

The converted red and green lights are reflected on dichroic mirror 3d in a 90-degree direction, and pass through lens 4e. Then, the converted red and green lights are reflected on mirror 3e further in a 90-degree direction, and enter rod integrator 5.

The laser lights of three primary colors R, G, and B are mixed by rod integrator 5, and pass through lens 4f and mirrors 3f and 3g, and enter the boundary layer of TIR prism 6a. Because total internal reflection occurs in TIR prism 6a, the laser lights of three primary colors R, G, and B are reflected toward color prism 6b.

Color prism 6b causes the lights separated into three primary colors R, G, and B to respectively enter three DMDs 7.

The light rays are reflected by DMDs 7 to form an image are combined by color prism 6b, then pass through the boundary layer of TIR prism 6a, and enter projection lens 8 to project a video image onto a projection screen.

In projector 100 of the present exemplary embodiment, the blue laser light emanating from blue LDs 2a and 2b as the excitation light sources excites the red phosphor and the green phosphor contained in phosphor layer 13b provided on a surface of phosphor wheel 13, to produce red light and green light. In this case, not all the energy of the blue laser light is converted into fluorescence emission, but a portion thereof is converted into thermal energy, which causes the temperatures of the red phosphor and the green phosphor to increase.

Here, the phosphors show poorer light conversion efficiency as the temperature increases. Moreover, when the temperature of the phosphors increases, the binder that fixes the phosphors onto phosphor wheel 13 to form phosphor layer 13b may cause thermal discoloration or the like. For this reason, phosphor wheel 13 is rotated by motor 14 to prevent the phosphors from temperature increases.

However, because the intensity of excitation light tends to increase in association with ever-increasing brightness of projector 100, merely rotating phosphor wheel 13 does not yield sufficient cooling performance for the phosphor portions. For this reason, it is necessary to send cooling air to the portion of phosphor layer 13b to forcibly cool the phosphors.

Figure 5:
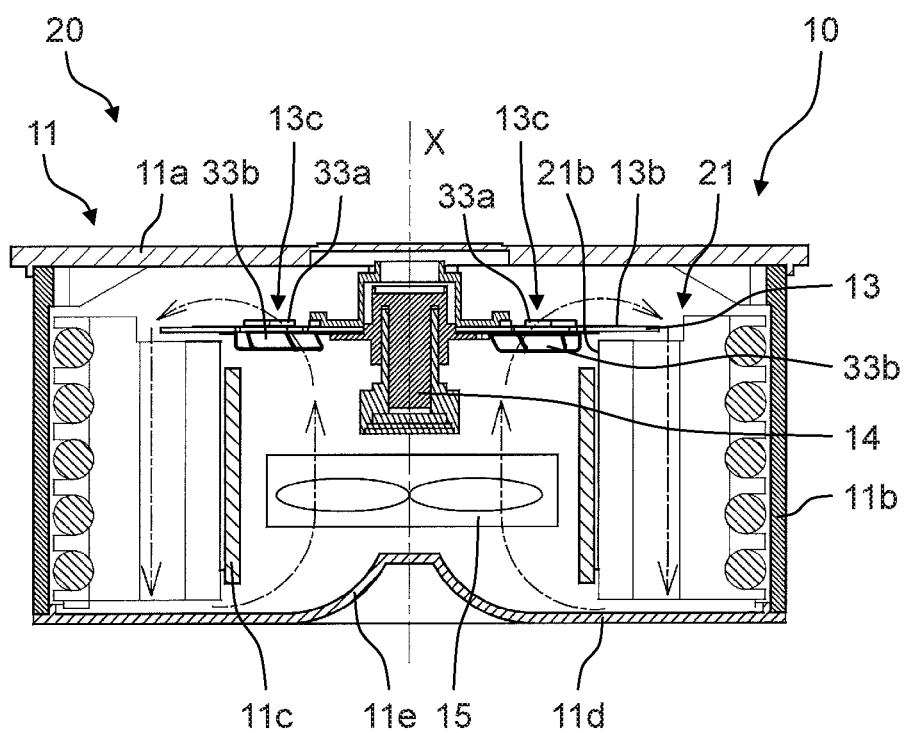
FIG. 5 is a cross-sectional view illustrating a configuration of the inside of the light conversion unit of FIG. 2.

Accordingly, the present exemplary embodiment employs phosphor wheel 13 including blade parts 33a (first blade parts) and blade parts 33b (second blade parts) in order to send cooling air to phosphor layer 13b provided in an annular shape on the first surface having a disk shape, as illustrated in FIG. 5. Blade parts 33a are provided at positions adjacent to openings 13c in the first surface. Blade parts 33b are provided on the second surface side, which is opposite the first surface.

It should be noted that the configuration of phosphor wheel device 10 and the configuration of light conversion unit 20 provided therewith will be described in detail later.

Configuration of Light Conversion Unit 20

Figure 2:
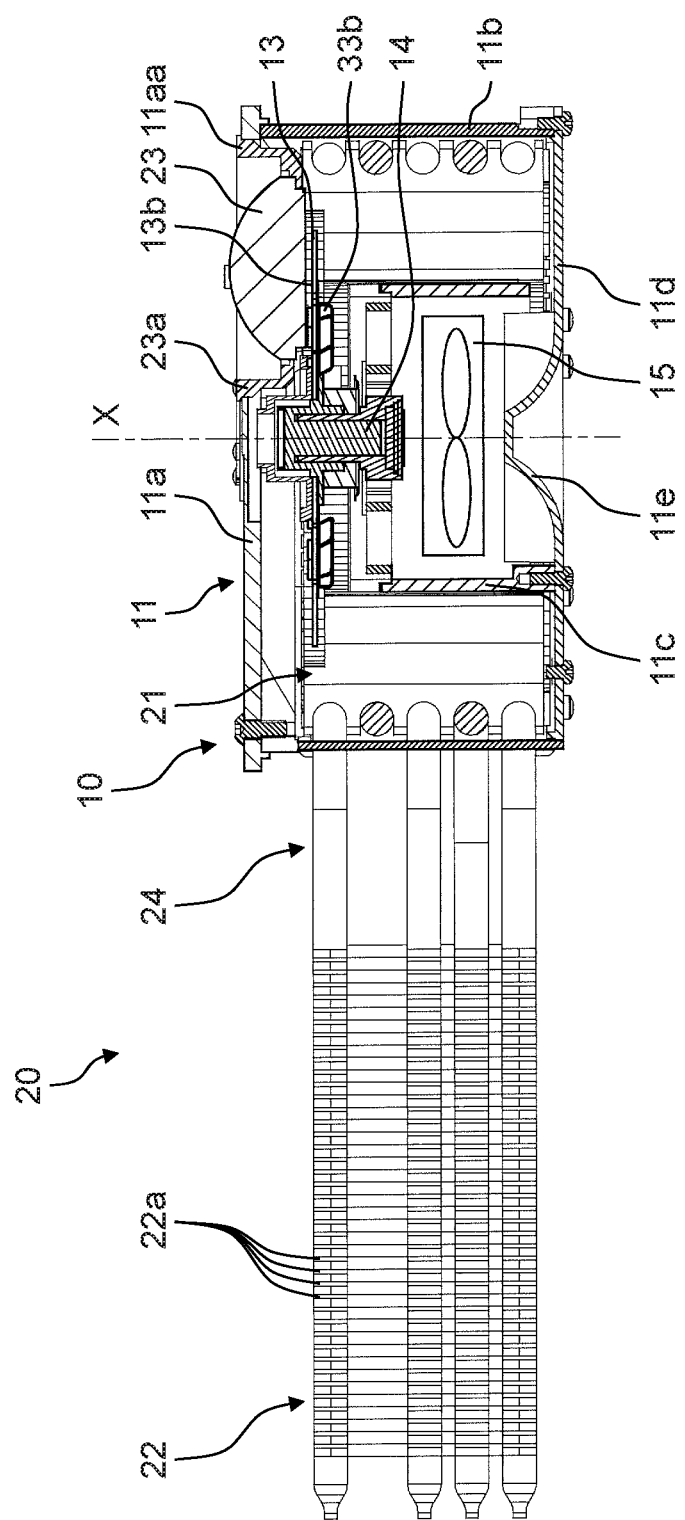
FIG. 2 is a view illustrating the configuration of a main part of a light conversion unit included in the projection display apparatus of FIG. 1.
Figure 3:
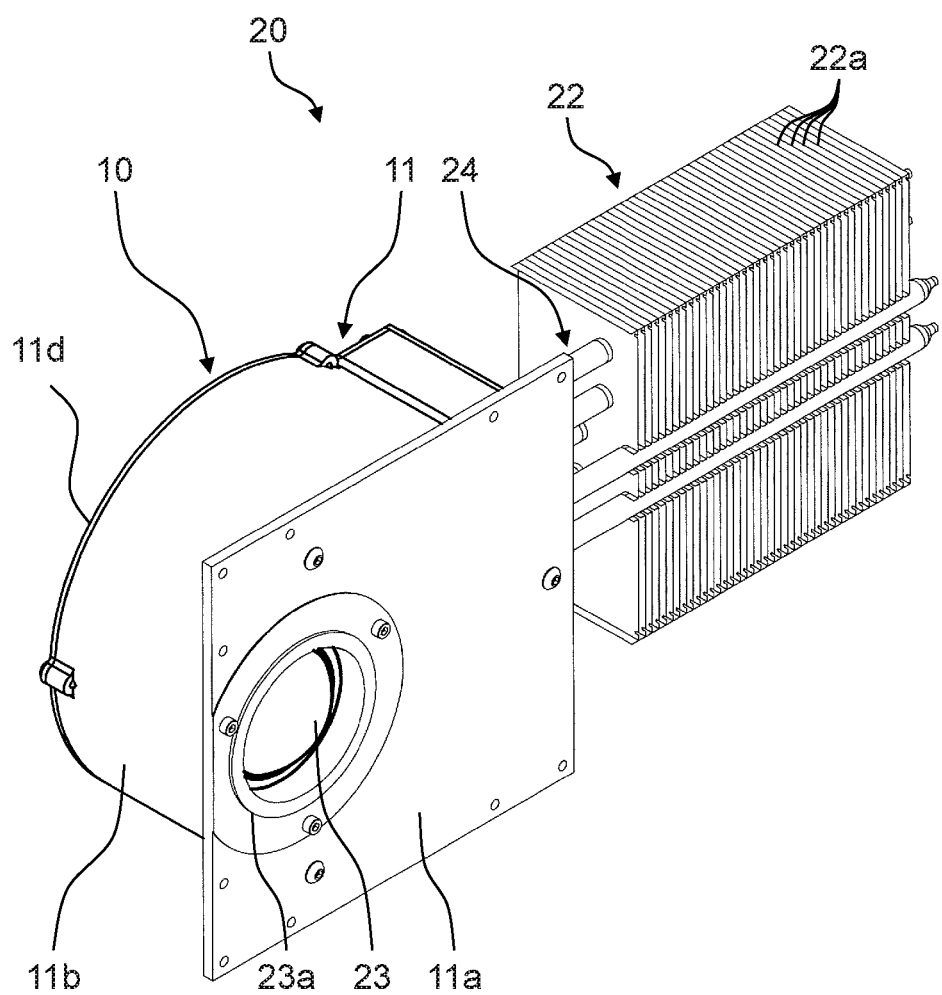
FIG. 3 is a perspective view illustrating the external appearance of the light conversion unit of FIG. 2.

FIG. 2 is a view illustrating a configuration of a main part of a light conversion unit included in the projection display apparatus of FIG. 1. FIG. 3 is a perspective view illustrating the external appearance of the light conversion unit of FIG. 2.

Light conversion unit 20 of the present exemplary embodiment includes, as shown in FIG. 2, later-described phosphor wheel device 10, heat absorber 21, heat dissipator 22, optical lens 23, and heat pipe 24.

In light conversion unit 20, phosphor wheel device 10 converts the blue laser light into red light and green light, by applying the incident blue laser light to phosphors. The configuration of phosphor wheel device 10 will be described in detail later.

Figure 4A:
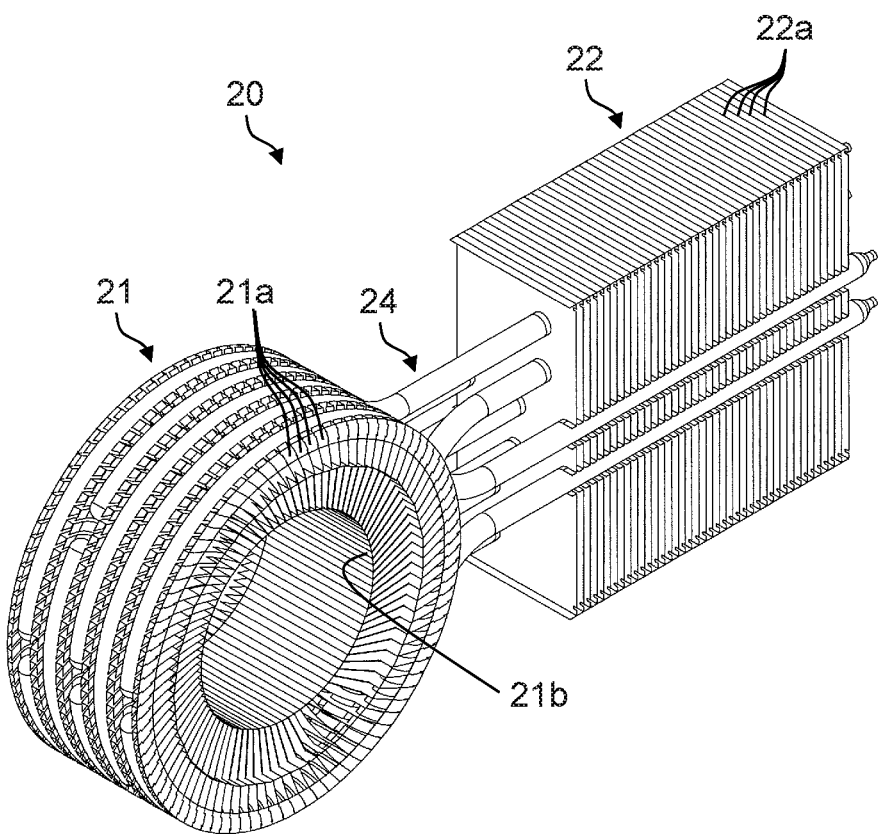
FIG. 4A is a perspective view illustrating the configuration of a heat absorber disposed inside the light conversion unit of FIG. 2 and a heat dissipator thermally connected with the heat absorber.
Figure 4B:
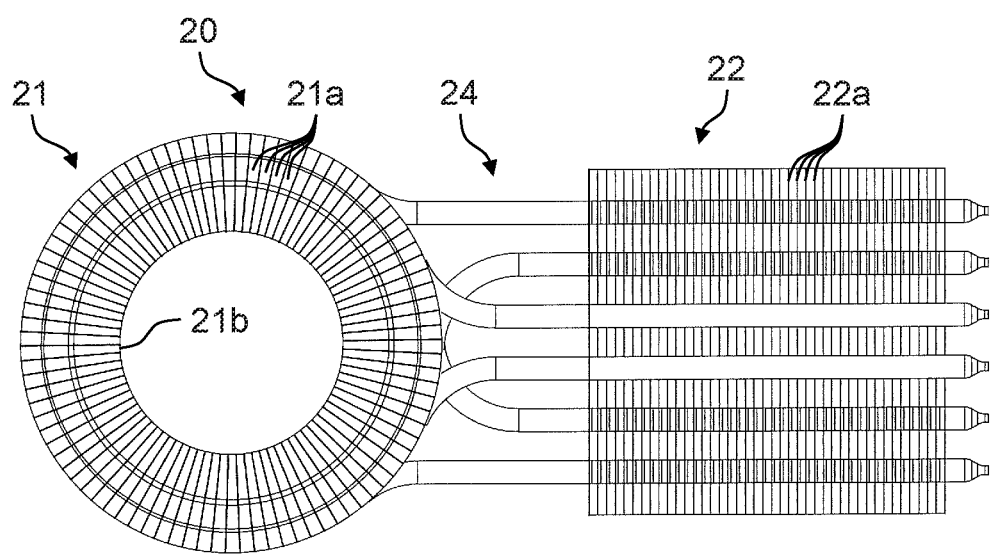
FIG. 4B is a plan view of FIG. 4A.

FIG. 4A is a perspective view illustrating the configuration of a heat absorber disposed inside the light conversion unit of FIG. 2 and a heat dissipator thermally connected with the heat absorber. FIG. 4B is a plan view of FIG. 4A.

As illustrated in FIG. 2, heat absorber 21 is disposed in case unit 11 of phosphor wheel device 10. Heat absorber 21 has a fin structure through which the airstream produced within light conversion unit 20 can pass. Heat absorber 21 absorbs heat from the airstream that carries the heat produced in phosphor layer 13b of phosphor wheel 13. As illustrated in FIG. 3, heat absorber 21 is fastened with screws to outer cylinder part 1ib and bottom part 1id, which are included in case unit 11 of phosphor wheel device 10. In addition, heat absorber 21 is thermally connected with heat dissipator 22 via heat pipe 24. As illustrated in FIGS. 4A and 4B, heat absorber 21 includes a plurality of fins 21a and stationary wall 21b.

The plurality of fins 21a are made of a metal having a high thermal conductivity and arranged radially in plan view, as illustrated in FIG. 4B. This enables the airstream entering the gap between phosphor wheel 13 and lid part 11a through a plurality of openings 13c, which penetrate phosphor wheel 13, to be guided radially outwardly.

At this time, because phosphor layer 13b is provided on a surface (i.e., the first surface) of phosphor wheel 13 that faces lid part 11a, the heat produced in the phosphors can be cooled efficiently by blowing air to the vicinity of phosphor layer 13b effectively. Also, the heat carried by the airstream is transferred to fins 21a when the airstream passes through the gaps between the plurality of fins 21a, so the temperature of the airstream can be decreased.

Stationary wall 21b is a portion of the inner circumferential surface of heat absorber 21 that is fixedly disposed circumferentially outward of blade parts 33a and 33b, and it restricts the airstream produced by blade parts 33a and 33b from flowing in radial directions from the center of rotation while phosphor wheel 13 is rotating.

As a result, when rotating phosphor wheel 13, the airstream produced by blade parts 33a and 33b can be guided efficiently through the openings 13c toward the side formed with phosphor layer 13b.

As illustrated in FIG. 2, heat dissipator 22 is disposed outside case unit 11 of phosphor wheel device 10. As illustrated in FIG. 3 and so forth, heat dissipator 22 is thermally connected with heat absorber 21 via heat pipe 24. Heat dissipator 22 dissipates the heat carried by the airstream, which is absorbed by heat absorber 21, to outside of case unit 11. In addition, heat dissipator 22 has a fin structure including a plurality of fins 22a disposed on its outer peripheral surface.

The plurality of fins 22a are made of a metal having a high thermal conductivity. As illustrated in FIGS. 4A and 4B, the plurality of fins 22a are arranged along a direction perpendicular to a longitudinal axis of heat pipe 24 to dissipates heat to the air external to case unit 11.

As illustrated in FIGS. 2 and 3, optical lens 23 is attached to an opening formed in lid part 11a of case unit 11 via optical lens retaining part 23a. As illustrated in FIG. 1, optical lens 23 transmits the excitation light for exciting the phosphors in phosphor layer 13b of phosphor wheel 13 and condenses the emission light emitted from the phosphors in phosphor layer 13b and guides the light toward dichroic mirror 3d.

As illustrated in FIGS. 4A and 4B, heat pipe 24 thermally connects heat absorber 21 and heat dissipator 22 to each other. A hollow space is formed inside heat pipe 24. A small amount of water is enclosed in the hollow space. When the enclosed water receives heat on the heat absorber 21 side, the water vaporizes and turns into water vapor, and the water vapor moves to heat dissipator 22 side. The water vapor that has moved to the heat dissipator 22 is cooled in heat dissipator 22 and liquefied into water. Here, after cooled and turned into water on heat dissipator 22 side, the water travels in the hollow space by capillary action and moves again to heat absorber 21.

That is, inside heat pipe 24, a small amount of water is vaporized on heat absorber 21 side and liquefied on heat dissipator 22 side, so that the water functions as a cooling medium.

Configuration of Phosphor Wheel Device 10

Phosphor wheel device 10 of the present exemplary embodiment is a device for converting the blue light (excitation light) emanating from blue LDs 2a and 2b into red light and green light. As illustrated in FIG. 2, phosphor wheel device 10 includes case unit 11, phosphor wheel 13, motor 14, and pressure fan 15.

FIG. 5 is a cross-sectional view illustrating a configuration of the inside of the light conversion unit of FIG. 2.

As illustrated in FIGS. 2 and 5, case unit 11 defines a sealed space for enclosing phosphor wheel 13, motor 14, heat absorber 21, and so forth inside the internal space in a cylindrical shape (see FIG. 3). As illustrated in FIG. 5, a circulation passage of the airstream produced by blade parts 33a and 33b is formed inside case unit 11 when phosphor wheel 13 rotates. In addition, case unit 11 includes outer cylinder part 11b and inner cylinder part 11c, which are disposed in a substantially concentric two-circle shape, as illustrated in FIG. 5. In the inside of case unit 11, the opposite ends along axis X are allowed to communicate with each other by outer cylinder part 11b and inner cylinder part 11c, and a circulation passage for airstream is formed therebetween.

Moreover, at least a portion of case unit 11 that is in contact with the ambient air is formed of a metal. As a result, heat can be released to outside efficiently even when the inside of case unit 11 is heated by the heat produced in the phosphor portion of phosphor layer 13b of phosphor wheel 13, which is installed in case unit 11, because case unit 11 is formed of a metal, which has high thermal conductivity.

It is preferable that the portion of case unit 11 that is to be formed of a metal should be, for example, a side of lid part 11a that faces phosphor wheel 13.

Specifically, as illustrated in FIG. 5, the airstream that carries the heat produced in the phosphor portion of phosphor layer 13b passes through the vicinity of lid part 11a that is disposed proximate to phosphor layer 13b of phosphor wheel 13 before entering into heat absorber 21.

This makes it possible to release the heat of lid part 11a to outside effectively even when lid part 11a is heated by the heated airstream that has passed through the vicinity of phosphor layer 13b of phosphor wheel 13. As a result, lid part 11a is able to release the heat of the airstream to outside more effectively than the other members that constitute case unit 11 (i.e., outer cylinder part 11b, inner cylinder part 11c, and bottom part 11d).

As illustrated in FIG. 3, lid part 11a is a substantially quadrangular plate-shaped member. Lid part 11a is mounted so as to cover the surface of phosphor wheel 13 provided with phosphor layer 13b (i.e., the first surface) in case unit 11. In addition, opening 11aa (see FIG. 2), to which the previously-mentioned optical lens 23 is attached, is formed in lid part 11a.

Opening 11aa is a through hole formed at a position in lid part 11a that faces phosphor layer 13b of phosphor wheel 13. Optical lens 23, through which blue laser light and excitation light (red and green) pass, is attached to opening 11aa with optical lens retaining part 23a.

Figure 6A:
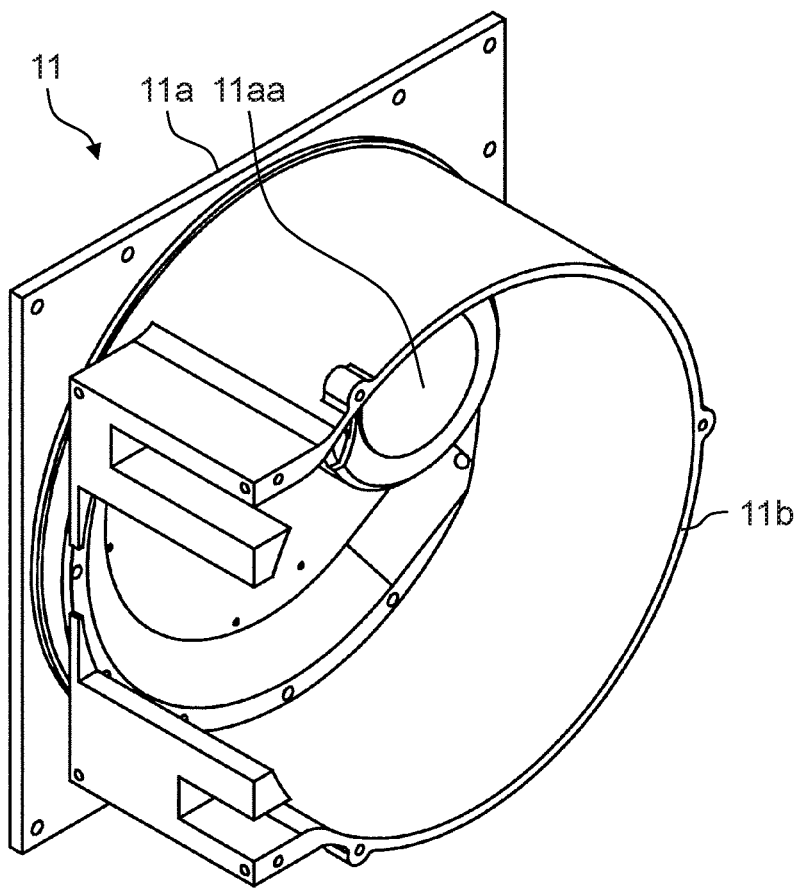
FIG. 6A is a perspective view illustrating a guide formed on an inner surface of a case of the light conversion unit of FIG. 2.
Figure 6B:
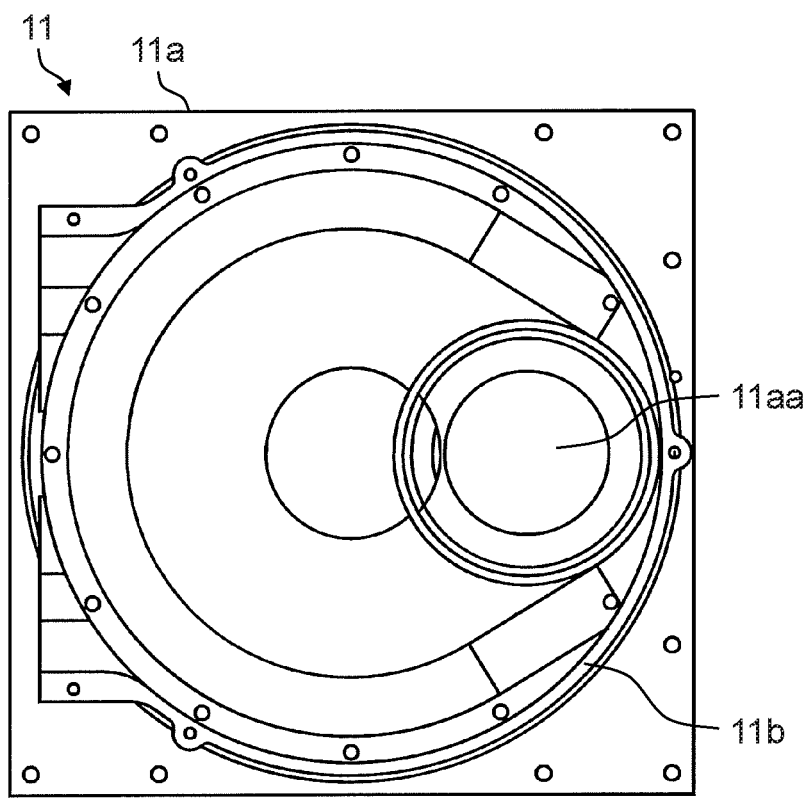
FIG. 6B is a plan view of FIG. 6A.

FIG. 6A is a perspective view illustrating a guide formed on an inner surface of a case of the conversion device of FIG. 2. FIG. 6B is a plan view of FIG. 6A.

As illustrated in FIGS. 3, 6A, and 6B, outer cylinder part 11b is a substantially cylindrical member that defines a side face of case unit 11. In addition, outer cylinder part 11b is provided with an open section on a side thereof in which heat absorber 21, which is enclosed in case unit 11, is connected with heat dissipator 22, which is provided external to case unit 11. The open section is closed by a lid to hermetically seal the inside of case unit 11.

As illustrated in FIG. 5, inner cylinder part 11c is a cylindrical member disposed concentrically with outer cylinder part 11b. Inner cylinder part 11c is disposed radially inward of outer cylinder part 11b. In addition, inner cylinder part 11c is disposed at a position adjacent to the inner circumferential end of heat absorber 21. Furthermore, as illustrated in FIG. 5, inner cylinder part 11c is formed so as to have a smaller dimension along axis X than that of outer cylinder part 11b.

Thus, in cross section shown in FIG. 5, a communicated condition is established in the opposite ends along axis X between outer cylinder part 11b and inner cylinder part 11c.

Thereby, the airstream produced by blade parts 33a and 33b in association with rotation of phosphor wheel 13 is allowed to pass from the inner circumferential end of inner cylinder part 11c through the communication part on phosphor wheel 13 side, and is guided radially outwardly, while it passes the vicinity of phosphor layer 13b of phosphor wheel 13. Then, as illustrated in FIG. 5, the airstream is cooled by passing through the inside of heat absorber 21 while traveling downwardly along axis X. The airstream cooled by passing through heat absorber 21 is again returned to the inner circumferential surface side of inner cylinder part 11c through the communication part opposite to phosphor wheel 13.

As illustrated in FIG. 5, bottom part 11d is mounted so as to cover the surface of case unit 11 that is opposite to lid part 11a along axis X.

As illustrated in FIG. 5, airstream ascending guide 11e is a guide member that reverses the cooled airstream that has passed through heat absorber 21 and causes the cooled airstream to ascend. Airstream ascending guide 11e is provided on a surface of bottom part 11d that faces the internal space of case unit 11. Airstream ascending guide 11e has a substantially conical shape centered about axis X. Airstream ascending guide 11e guides the airstream that has flowed from an outer circumferential region into an inner circumferential region so as to be directed upward by the wind force produced by blade parts 33b and pressure fan 15.

Phosphor Wheel 13

Figure 7A:
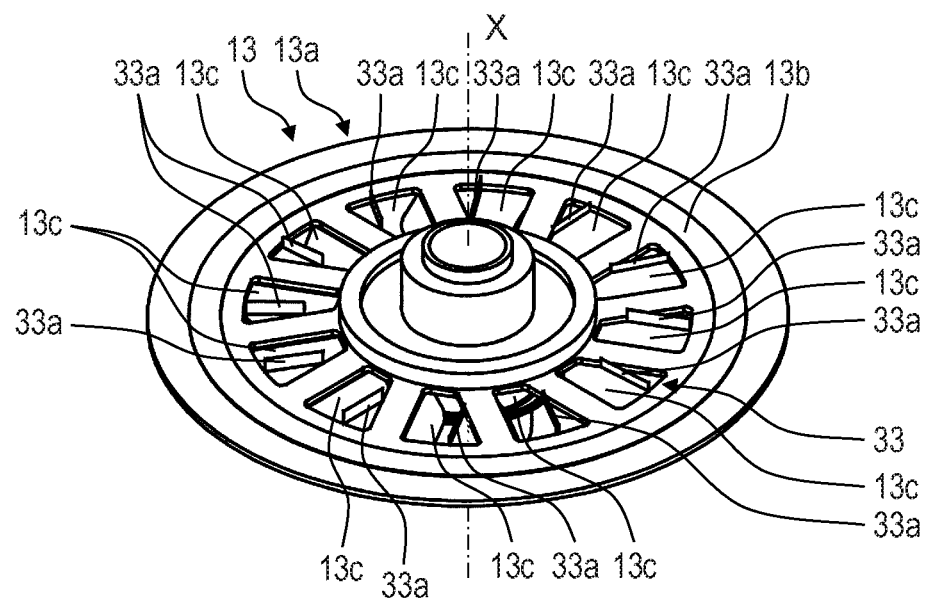
FIG. 7A is a perspective view illustrating a first surface side of a phosphor wheel of a phosphor wheel device included in the light conversion unit of FIG. 2.
Figure 7B:
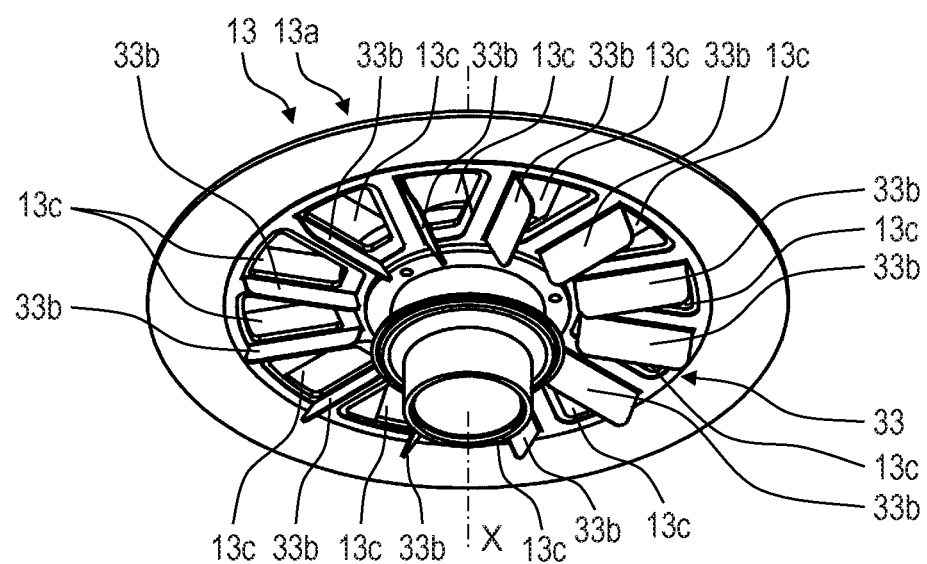
FIG. 7B is a perspective view illustrating a second surface side of the phosphor wheel of FIG. 7A.

FIG. 7A is a perspective view illustrating a first surface side of a phosphor wheel of a phosphor wheel device included in the light conversion unit of FIG. 2. FIG. 7B is a perspective view illustrating a second surface side of the phosphor wheel of FIG. 7A.

As illustrated in FIGS. 7A and 7B, phosphor wheel 13 is a disk-shaped rotating member that is rotated by motor 14. Phosphor wheel 13 is configured by combining disk-shaped substrate 13a and disk-shaped member 33 together.

Substrate 13a includes phosphor layer 13b and openings 13c.

Disk-shaped member 33 includes blade parts 33a (each being an example of first blade part) and blade parts 33b (each being an example of second blade part).

Phosphor layer 13b is formed on the surface facing optical lens 23 by applying phosphors thereto in an annular shape. Phosphor layer 13b converts the blue laser light emanating from blue LDs 2a and 2b into red light and green light.

This enables phosphor wheel 13 to emit red light and green light.

As illustrated in FIG. 5, blade parts 33b form the airstream inside case unit 11 for dissipating the heat produced when the phosphors in phosphor layer 13b of phosphor wheel 13 are excited. As illustrated in FIG. 7B, a plurality of blade parts 33b are provided on the second surface of phosphor wheel 13, which is opposite the first surface provided with phosphor layer 13b, so as to extend radially.

Figure 8A:
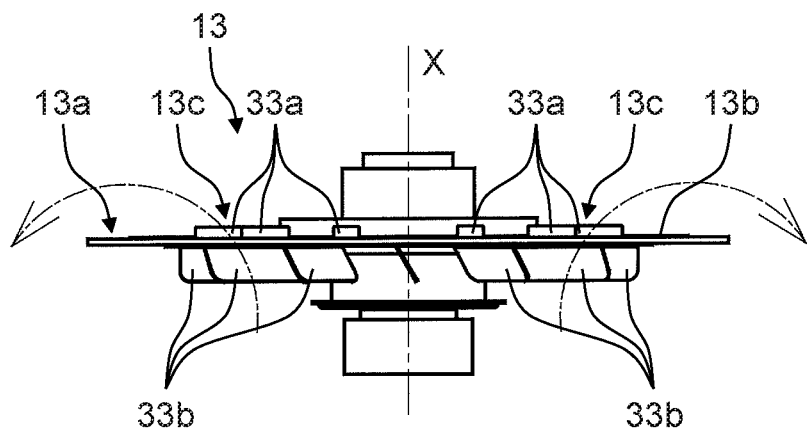
FIG. 8A is a side view illustrating flow directions of the airstream that is produced by rotating the phosphor wheel shown in FIG. 7A and so forth.
Figure 8B:
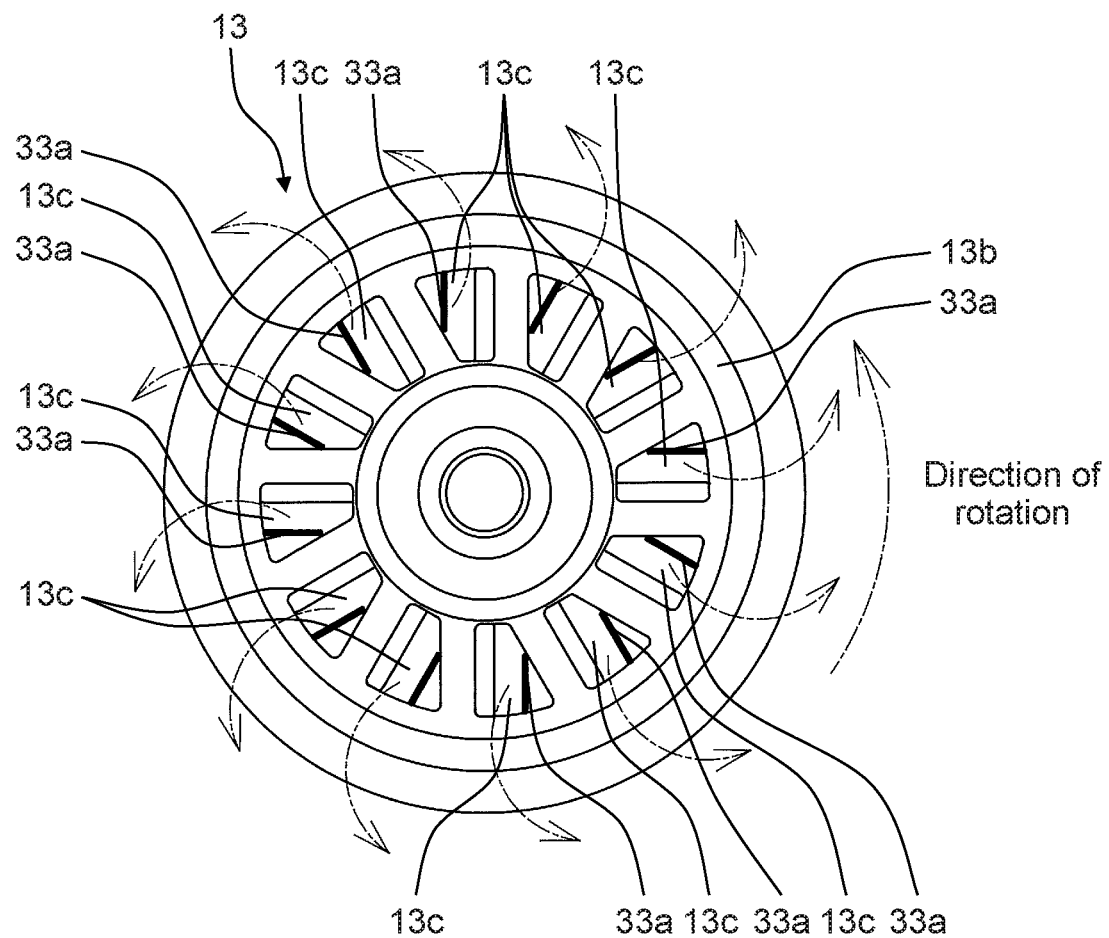
FIG. 8B is a plan view of FIG. 8A.

FIG. 8A is a side view illustrating flow directions of the airstream that is produced by rotating the phosphor wheel shown in FIG. 7A and so forth. FIG. 8B is a plan view of FIG. 8A.

Here, when phosphor wheel 13 is driven to rotate, blade parts 33b integrated with phosphor wheel 13 produce airstream in an upward direction along axis X.

In the present exemplary embodiment, openings 13c are formed at positions in phosphor wheel 13 that respectively correspond to blade parts 33b. As a result, the airstream produced by blade parts 33b is sent through openings 13c toward phosphor layer 13b side of phosphor wheel 13.

Also, the airstream produced by blade parts 33b is heated in the vicinity of phosphor layer 13b of phosphor wheel 13 within the sealed space formed inside case unit 11, and is then passed through heat absorber 21 disposed in the space between outer cylinder part lib and inner cylinder part 11c.

At this time, heat is exchanged between the heated air and a small amount of water in heat pipe 24, which is connected with heat absorber 21, so that the heated air is cooled. Thereafter, the cooled air is moved within the inner circumferential region of the inner cylinder part 11c and is sent out through openings 13c toward phosphor layer 13b side of phosphor wheel 13.

As illustrated in FIG. 7A, a plurality of openings 13c are provided radially inward of annular-shaped phosphor layer 13b, which is provided on the first surface of phosphor wheel 13. In addition, each of openings 13c has a trapezoidal shape whose base closer to axis X is shorter, and the plurality of openings 13c are arrayed along a circumferential direction and centered about axis X. The plurality of openings 13c are provided at positions respectively corresponding to the positions at which the foregoing blade parts 33b are attached. Note that the shape of each opening 13c is not limited to a trapezoidal shape, but may be a substantially sectoral shape.

As a result, as illustrated in FIG. 8B, the airstream produced by blade parts 33b along axis X is passed through openings 13c, is guided toward the first surface, on which phosphor layer 13b is formed, and is also moved radially outward by blade parts 33a.

Figure 9:
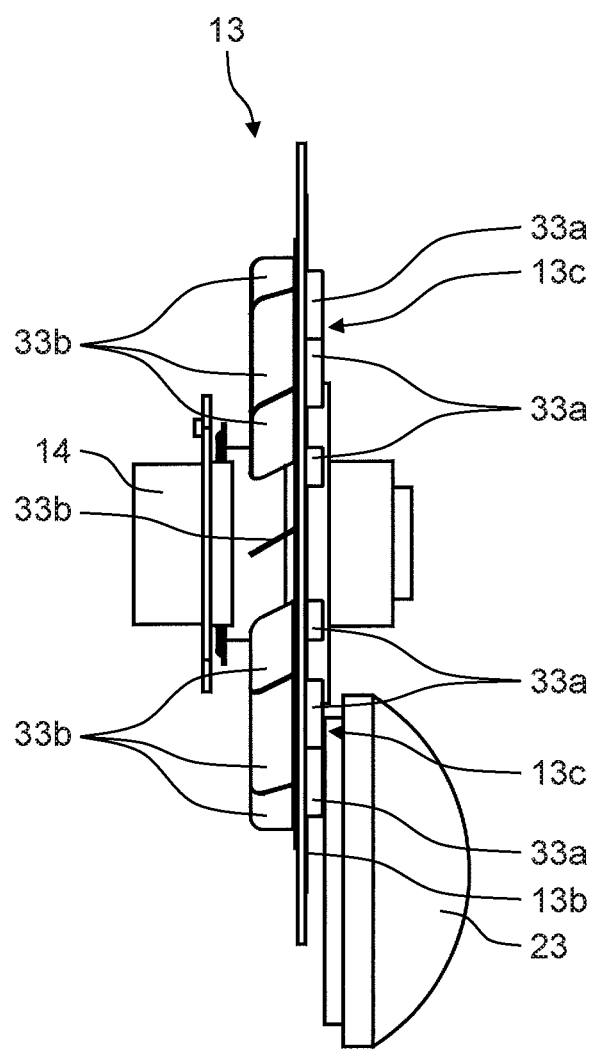
FIG. 9 is a side view illustrating a lens disposed proximate to a phosphor layer portion of the phosphor wheel shown in FIG. 7A and so forth.

FIG. 9 is a side view illustrating a lens disposed proximate to a phosphor layer portion of the phosphor wheel shown in FIG. 7A and so forth.

As illustrated in FIG. 9, motor 14 is connected to the rotary shaft of phosphor wheel 13 to rotate phosphor wheel 13 and blade parts 33a and 33b. In addition, as illustrated in FIG. 5, motor 14 is disposed on the flow passage of the airstream that is cooled by heat absorber 21.

This allows motor 14 to be cooled effectively by cooling air even in cases where heat is produced in motor 14 when continuously rotating phosphor wheel 13.

As illustrated in FIG. 5, pressure fan 15 is disposed in the circulation passage of the airstream formed inside case unit 11. Pressure fan 15 blows air along the direction in which the airstream flows in the circulation passage. In other words, pressure fan 15 is disposed so as to blow air along the direction in which the airstream produced by blade parts 33b flows. In addition, pressure fan 15 is disposed at a position between phosphor wheel 13 and airstream ascending guide 11e within case unit 11.

This allows pressure fan 15 to be placed at the most downstream end in the circulation passage of the airstream formed along axis X by blade parts 33b so that the airstream can be strengthened at the most downstream position, where the airstream produced by blade parts 33b tends to be weakest.

As a result, the flow rate of the airstream can be increased to further enhance the cooling effect, for example, in the vicinity of phosphor layer 13b of phosphor wheel 13 and in the vicinity of motor 14 in case unit 11, where undesirable heat is generated.

Figure 10A:
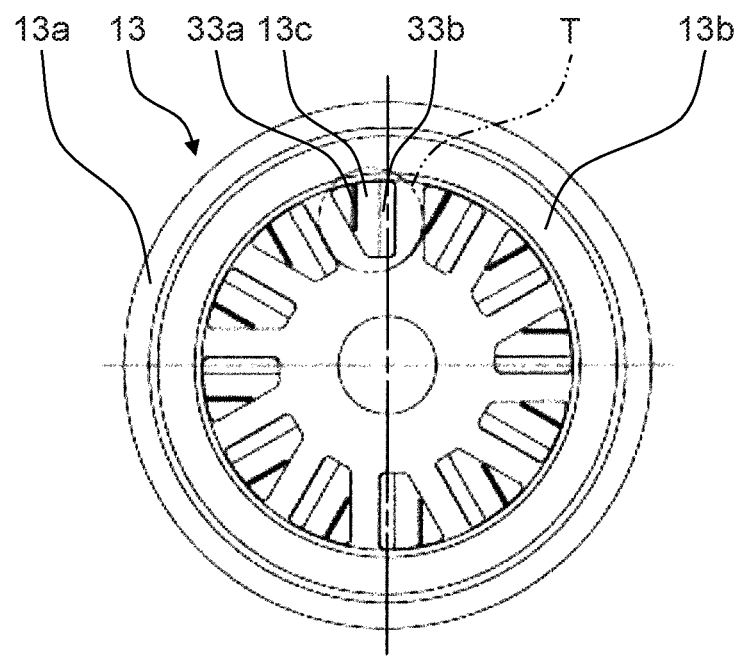
FIG. 10A is a plan view illustrating a configuration of the phosphor wheel shown in FIG. 7A and so forth.
Figure 10B:
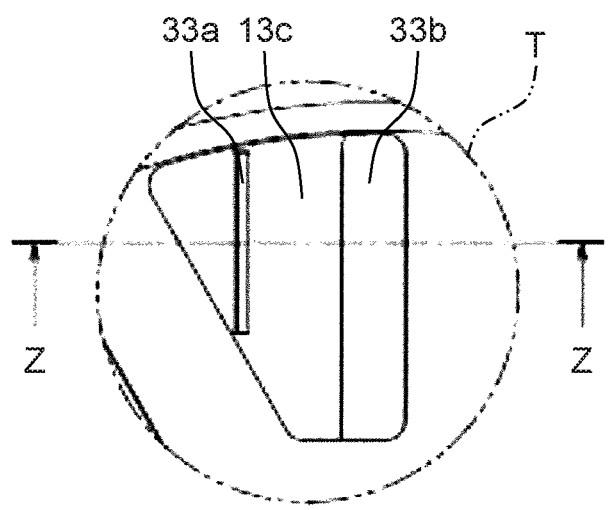
FIG. 10B is an enlarged view illustrating a main part of FIG. 10A.
Figure 10C:
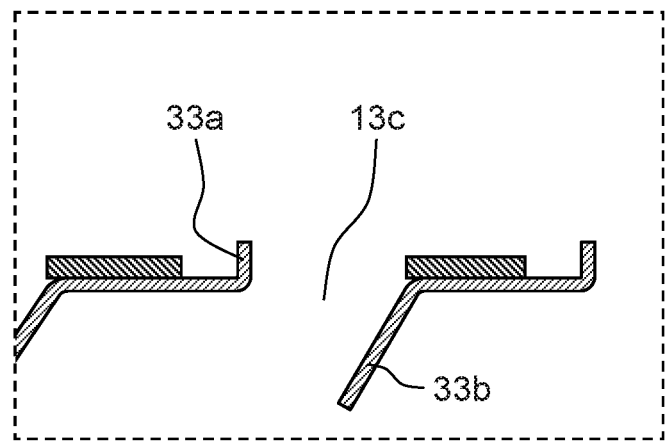
FIG. 10C is a cross-sectional view illustrating a main part of FIG. 10B

FIG. 10A is a plan view illustrating a configuration of the phosphor wheel shown in FIG. 7A and so forth. FIG. 10B is an enlarged view illustrating a main part of FIG. 10A. Note that FIG. 10B is an enlarged view of main part T of FIG. 10A. FIG. 10C is a cross-sectional view illustrating a main part of FIG. 10B. Note that FIG. 10C is a cross-sectional view taken along line Z-Z in FIG. 10B, in which some part of the configuration is omitted.

As illustrated FIGS. 10A and 10B, blade parts 33a are provided on the surface on which phosphor layer 13b is provided (the first surface), that is, on the surface opposite the blade parts 33b, so as to be adjacent to openings 13c and to extend radially. As illustrated in FIG. 5, blade parts 33a produce the airstream directed radially outwardly in case unit 11 in order to dissipate the heat that is generated when exciting the phosphors in phosphor layer 13b of phosphor wheel 13.

More specifically, blade parts 33a guide the airstream that has been produced by the above-described blade parts 33b and pressure fan 15 along axis X and moved toward the surface provided with phosphor layer 13b through the plurality of openings 13c, formed in phosphor wheel 13, so that the airstream is directed radially outwardly.

As a result, the flow rate of the airstream can be increased in the vicinity of the surface of phosphor layer 13b of phosphor wheel 13 to effectively improve the cooling effect as compared to conventional phosphor wheels.

In addition, as illustrated in FIG. 9, blade parts 33*a* are disposed proximate to optical lens 23 at a position that faces optical lens 23 within the surface provided with phosphor layer 13*b*. For this reason, it is required that the height of each blade part 33*a* should not be in contact with optical lens 23.

As a result, it is possible to improve the cooling effect of phosphor layer 13*b* even when optical lens 23 is disposed proximate to the surface provided with phosphor layer 13*b*.

As illustrated in FIG. 10C, in phosphor wheel 13 of the present exemplary embodiment, blade parts 33*a* and 33*b*, which are provided for producing the above-described airstream, are formed by incising and erecting portions of a sheet of disk-shaped member made of aluminum. In other words, blade parts 33*a* and 33*b* are formed as part of a common member.

Specifically, as illustrated in FIG. 10C, blade parts 33*a* and 33*b* are formed by bending the portions incised for forming openings 13*c* respectively in a direction toward phosphor layer 13*b* and in the opposite direction.

Figure 11:
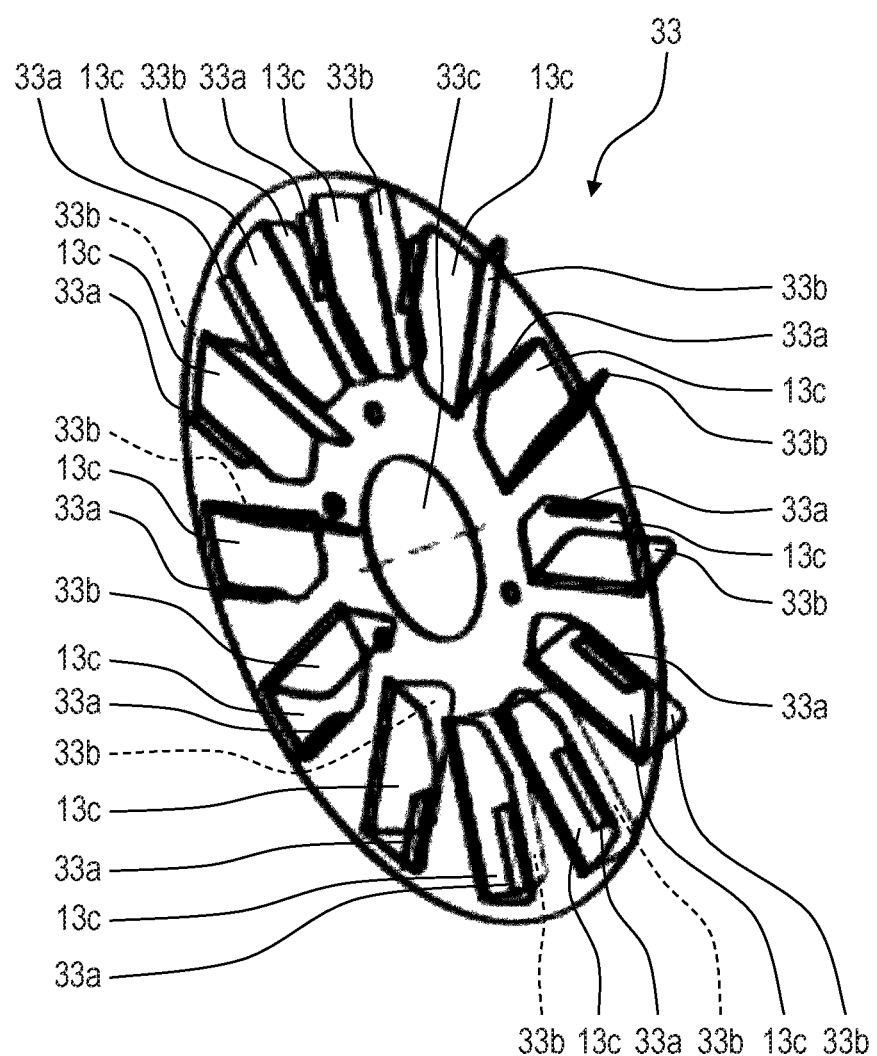
FIG. 11 is a perspective view illustrating a configuration of a disk-shaped member that constitutes the phosphor wheel shown in FIG. 10A and so forth.

FIG. 11 is a perspective view illustrating a configuration of a disk-shaped member that constitutes the phosphor wheel shown in FIG. 10A and so forth.

Phosphor wheel 13 is configured by combining disk-shaped member 33, shown in FIG. 11, and disk-shaped substrate 13*a* in which openings 13*c* are formed.

As illustrated in FIG. 11, disk-shaped member 33 includes central hole 33*c* at the center portion, and a plurality of blade parts 33*a* and 33*b*, centered about central hole 33*c*, are formed so as to extend radially and arrayed along the circumferential direction.

Alignment of disk-shaped member 33 with disk-shaped substrate 13*a*, which is likewise formed with an opening at the center portion, is achieved by overlapping disk-shaped member 33 with substrate 13*a* so that central hole 33*c* is fitted with the center opening of disk-shaped substrate 13*a*. It is also possible to perform alignment in the circumferential direction by overlapping disk-shaped member 33 with substrate 13*a* so that blade parts 33*a* are inserted respectively into openings 13*c* in substrate 13*a*.

Disk-shaped member 33 and substrate 13*a* are fixed by clamping them together with a securing member vertically along axis X in a condition such that they are overlapped with each other.

Circulation of Airstream Produced by Blade Parts 33*a* and 33*b*

As described previously, the present exemplary embodiment causes blade parts 33*a*, which are provided on the first surface side of phosphor wheel 13 incorporated in phosphor wheel device 10, and blade parts 33*b*, which are provided on the second surface side thereof, to rotate in an integrated condition in association with rotation of phosphor wheel 13, to thereby produce airstream within case unit 11.

Specifically, as illustrated in FIG. 5, the airstream produced by blade parts 33*b* is formed upwardly in the figure, and passes through openings 13*c* of phosphor wheel 13.

Note that the airstream formed by blade parts 33*a* and 33*b* has a flow that moves radially outward due to a centrifugal force or the like. However, the radially outward flow is restricted by stationary wall 21*b* of heat absorber 21, which is disposed proximate to radially outward portions of blade parts 33*b*. This makes it possible to restrain the radially outward flow of the air produced by blade parts 33*b* and to guide the airstream to openings 13*c* efficiently.

Next, the airstream that has passed through openings 13*c* of phosphor wheel 13 is sent by blade parts 33*a* in radially outward directions centered about the axis of rotation.

At this time, the airstream moving along phosphor layer 13*b* of phosphor wheel 13 is heated by the heat of the phosphor when it passes over the vicinity of phosphor layer 13*b*.

Next, the airstream heated by the phosphor is allowed to move downward in FIG. 5 by the inner surface of lid part 11*a* to pass through the gaps between fins 21*a* of heat absorber 21.

At this time, heat absorber 21 absorbs heat from the heated airstream to cool the airstream.

Next, the airstream cooled by heat absorber 21 moves from the lower end of heat absorber 21 with respect to axis X along the surface of bottom part 11*d*, and is guided by airstream ascending guide 11*e* toward phosphor wheel 13.

At this time, as illustrated in FIG. 5, the airstream that has been caused to ascend by airstream ascending guide 11*e* is moved at an increased flow rate by pressure fan 15.

Next, the airstream with a flow rate increased by pressure fan 15 flows in the vicinity of motor 14 to cool motor 14, and again moves toward blade parts 33*b*.

Thus, the heat generated by the phosphor in phosphor layer 13*b* of phosphor wheel 13 can be cooled effectively by the airstream produced by blade parts 33*b* along axis X and the airstream that is allowed to move toward the surface facing phosphor layer 13*b* through openings 13*c* and is thereafter sent radially outward by blade parts 33*a*.

Here, in order to effectively cool the heat generated in phosphor layer 13*b* of phosphor wheel 13, it is common practice to provide a fan at a position such that the fan can directly blow air from the front of phosphor layer 13*b*. However, in such a configuration, there may not be sufficient space for optical lens 23, which is disposed proximate to phosphor layer 13*b* of phosphor wheel 13, as seen from FIG. 9, depending on the arrangement of the fan, or there may a risk that the device size becomes undesirably larger.

In phosphor wheel device 10 of the present exemplary embodiment and light conversion unit 20 provided therewith, blade parts 33*a* and 33*b* for producing the airstream for cooling phosphor layer 13*b* of phosphor wheel 13 are provided respectively on the surface of phosphor wheel 13 that is provided with phosphor layer 13*b* and on the opposite surface, as described above. Furthermore, in the present exemplary embodiment, openings 13*c* are provided at positions in phosphor wheel 13 that respectively correspond to blade parts 33*b*, in order to guide the airstream produced by blade parts 33*b* toward phosphor layer 13*b* side provided with blade parts 33*a*.

Thereby, it is possible to provide sufficient space for optical lens 23 on phosphor layer 13*b* side of phosphor wheel 13 and to produce the airstream passing in the vicinity of phosphor layer 13*b* by blade parts 33*a* provided on the first surface of phosphor layer 13*b*.

As a result, it is possible to allow blade parts 33*a* and 33*b* to coexist with optical lens 23 and also effectively cool the heat generated by the phosphor in phosphor layer 13*b* without increasing the size of the device.

According to the results of an experiment that used the configuration according to the present disclosure, it was confirmed that the temperature increase was reduced by about 4% by providing blade parts 33*a* and 33*b*.

Other Exemplary Embodiments

Although exemplary embodiments of the present disclosure have been described hereinabove, it should be understood that the present disclosure is not limited to the foregoing exemplary embodiments, and various changes and modifications may be made without departing from the principles of the present disclosure.

(A)

The foregoing exemplary embodiment has described the configuration in which blade parts 33a are provided on the surface of phosphor wheel 13 that is provided with phosphor layer 13b (i.e., on the first surface) and blade parts 33b on the opposite surface (on the second surface) as an example. However, the present disclosure is not limited thereto.

For example, it is also possible that blade parts 33a may be provided only on the surface of phosphor wheel 13 that is provided with phosphor layer 13b (i.e., the first surface), while no blade part may be provided on the surface opposite the side formed with phosphor layer 13b (i.e., the second surface).

In this case as well, the airstream that has been caused to ascend by pressure fan 15 through openings 13c in phosphor wheel 13 along axis X can be guided radially outward by blade parts 33a. Therefore, the heat generated in phosphor layer 13b can be cooled effectively by sending airstream along the surface of phosphor layer 13b of phosphor wheel 13.

(B)

The foregoing exemplary embodiment has described phosphor wheel 13 in which each of blade parts 33a and each of blade parts 33b are provided along substantially parallel directions to each other on opposite sides of each of openings 13c. However, the present disclosure is not limited thereto.

Figure 12A:
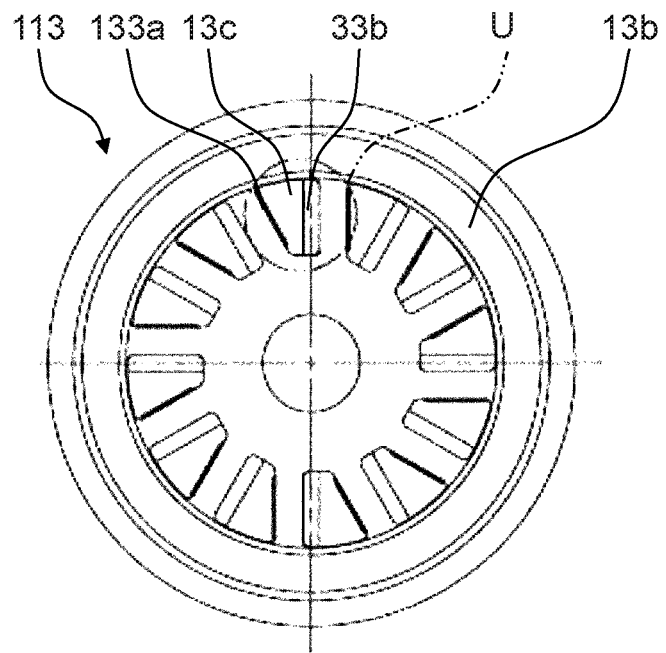
FIG. 12A is a plan view illustrating a configuration of a phosphor wheel according to another exemplary embodiment of the present disclosure.
Figure 12B:
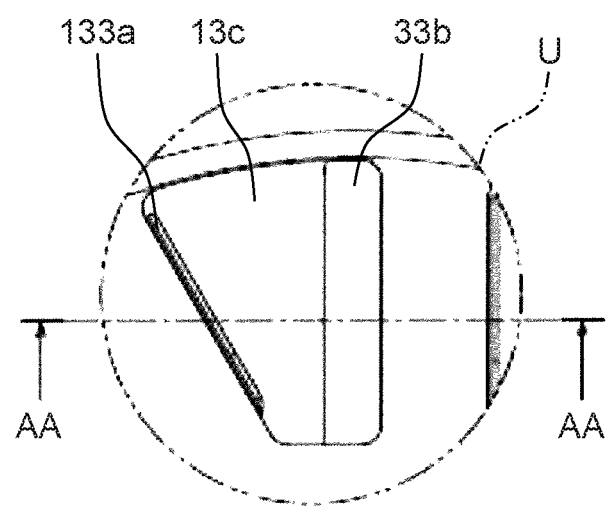
FIG. 12B is an enlarged view illustrating a main part of FIG. 12A.
Figure 12C:
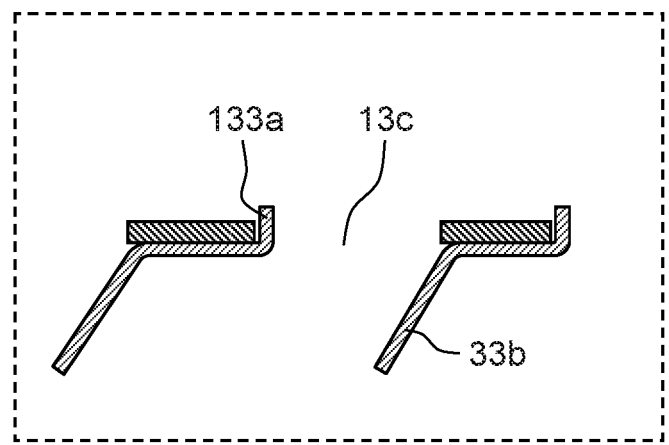
FIG. 12C is a cross-sectional view illustrating a main part of FIG. 12B.

FIG. 12A is a plan view illustrating a configuration of a phosphor wheel according to another exemplary embodiment of the present disclosure. FIG. 12B is an enlarged view illustrating a main part of FIG. 12A. Note that FIG. 12B is an enlarged view of main part U of FIG. 12A. FIG. 12C is a cross-sectional view illustrating a main part of FIG. 12B. Note that FIG. 12C is a cross-sectional view taken along line AA-AA in FIG. 12B, in which some part of the configuration is omitted.

For example, as illustrated in FIGS. 12A to 12C, it is possible to employ phosphor wheel 113 in which blade parts 133a disposed at opposite positions to blade parts 33b are disposed obliquely with respect to blade parts 33b.

Figure 13A:
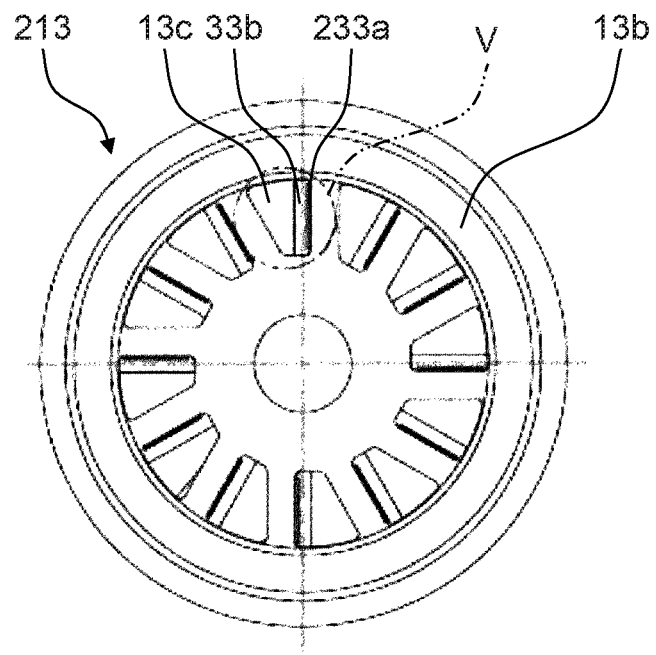
FIG. 13A is a plan view illustrating a configuration of a phosphor wheel according to yet another exemplary embodiment of the present disclosure.
Figure 13B:
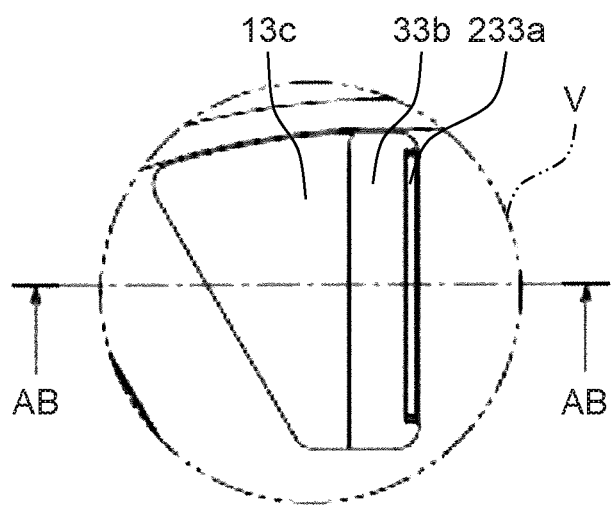
FIG. 13B is an enlarged view illustrating a main part of FIG. 13A.
Figure 13C:
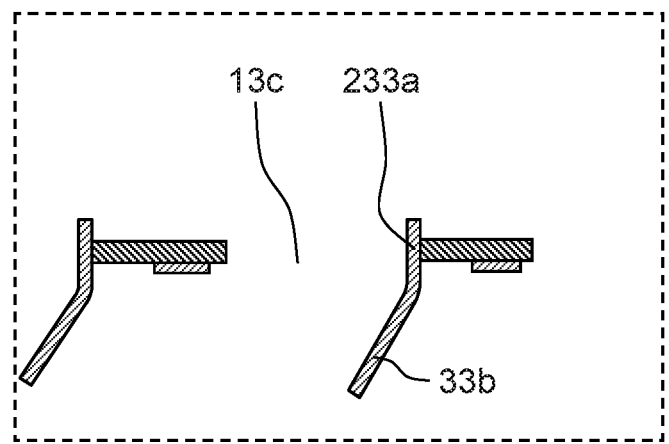
FIG. 13C is a cross-sectional view illustrating a main part of FIG. 13B.

FIG. 13A is a plan view illustrating a configuration of a phosphor wheel according to yet another exemplary embodiment of the present disclosure. FIG. 13B is an enlarged view illustrating a main part of FIG. 13A. Note that FIG. 13B is an enlarged view of main part V of FIG. 13A. FIG. 13C is a cross-sectional view illustrating a main part of FIG. 13B. Note that FIG. 13C is a cross-sectional view taken along line AB-AB in FIG. 13B, in which some part of the configuration is omitted.

As illustrated in FIGS. 13A to 13C, it is also possible to employ phosphor wheel 213 in which each of blade parts 233a is provided on the same side as the side provided with each of blade parts 33b.

Figure 14A:
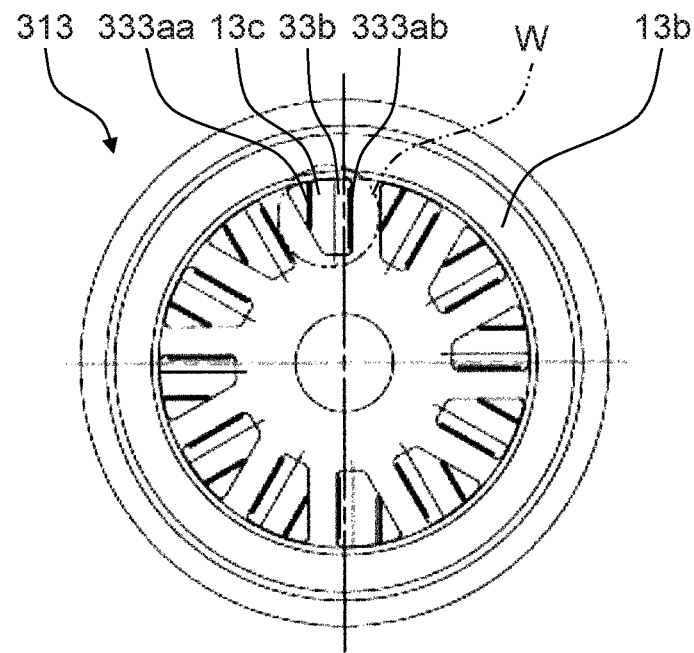
FIG. 14A is a plan view illustrating a configuration of a phosphor wheel according to still another exemplary embodiment of the present disclosure.
Figure 14B:
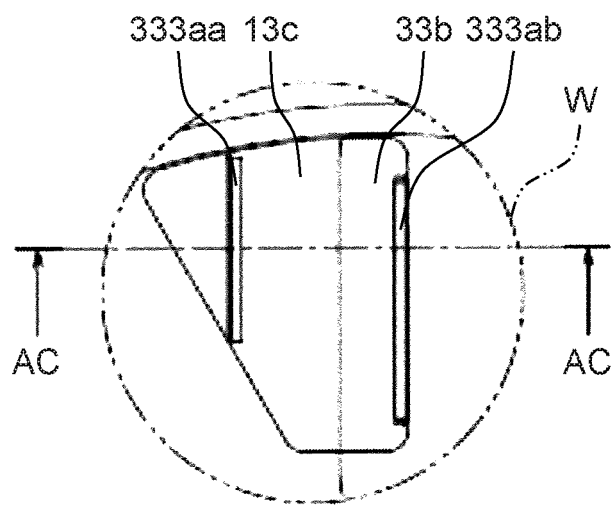
FIG. 14B is an enlarged view illustrating a main part of FIG. 14A.
Figure 14C:
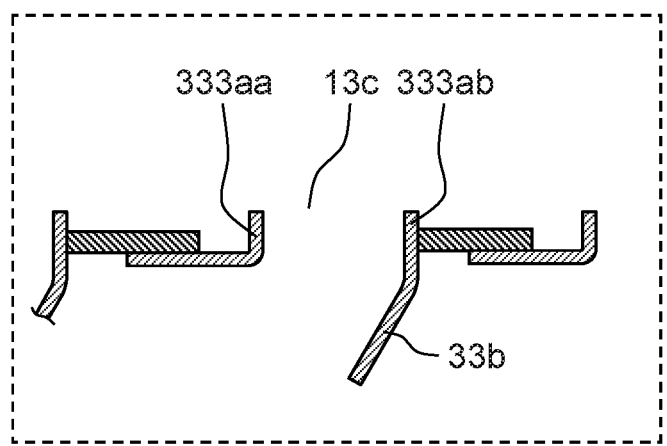
FIG. 14C is a cross-sectional view illustrating a main part of FIG. 14B.

FIG. 14A is a plan view illustrating a configuration of a phosphor wheel according to still another exemplary embodiment of the present disclosure. FIG. 14B is an enlarged view illustrating a main part of FIG. 14A. Note that FIG. 14B is an enlarged view of main part W of FIG. 14A. FIG. 14C is a cross-sectional view illustrating a main part of FIG. 14B. Note that FIG. 14C is a cross-sectional view taken along line AC-AC in FIG. 14B, in which some part of the configuration is omitted.

As illustrated in FIGS. 14A to 14C, it is also possible to employ phosphor wheel 313 in which one blade part 33b and two blade parts 333aa and 333ab are provided for each corresponding one of opening 13c.

In this case, the airstream is strengthened effectively in the vicinity of phosphor layer 13b and the cooling effect is improved because two blade parts 333aa and 333ab are provided for a corresponding one of openings 13c on the surface provided with phosphor layer 13b.

Figure 15A:
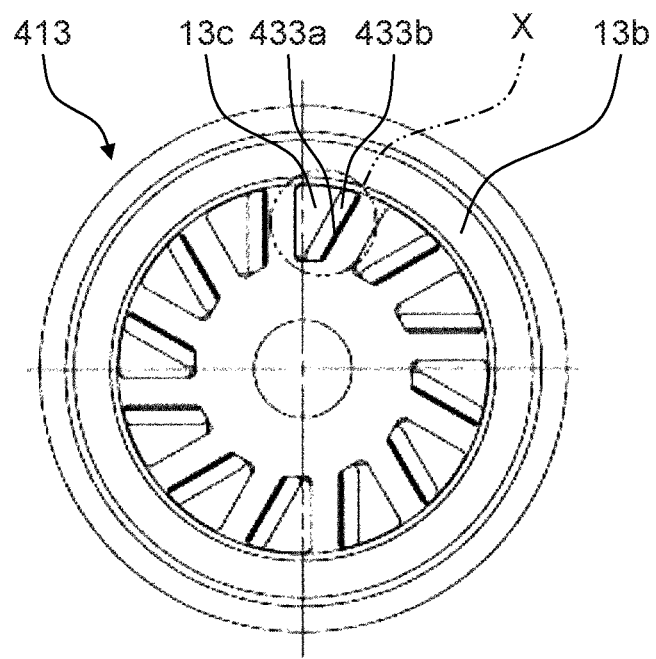
FIG. 15A is a plan view illustrating a configuration of a phosphor wheel according to further another exemplary embodiment of the present disclosure.
Figure 15B:
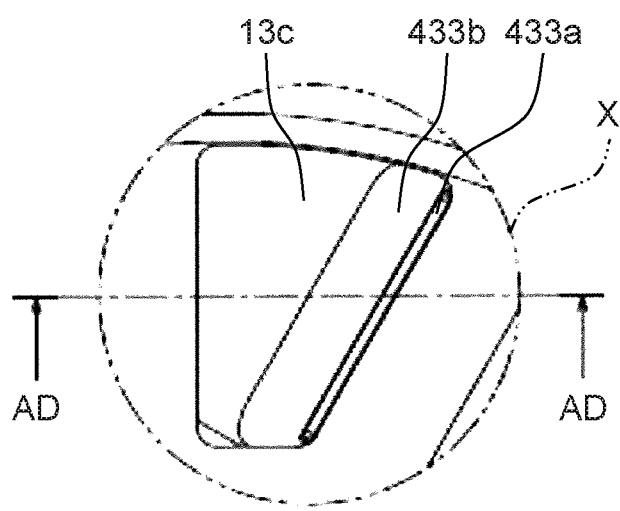
FIG. 15B is an enlarged view illustrating a main part of FIG. 15A.
Figure 15C:
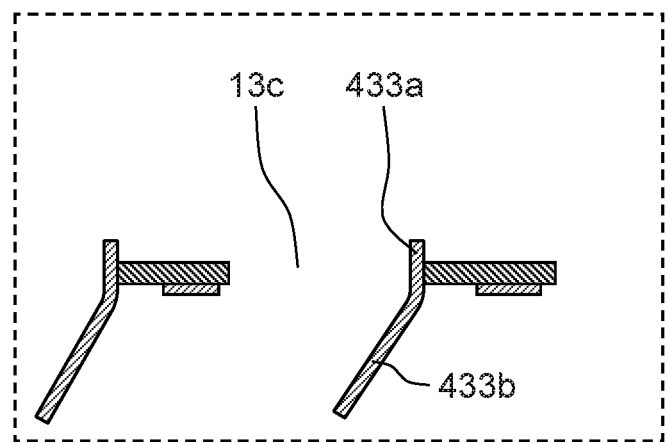
FIG. 15C is a cross-sectional view illustrating a main part of FIG. 15B.

FIG. 15A is a plan view illustrating a configuration of a phosphor wheel according to further another exemplary embodiment of the present disclosure. FIG. 15B is an enlarged view illustrating a main part of FIG. 15A. Note that FIG. 15B is an enlarged view of main part X of FIG. 15A. FIG. 15C is a cross-sectional view illustrating a main part of FIG. 15B. Note that FIG. 15C is a cross-sectional view taken along line AD-AD in FIG. 15B, in which some part of the configuration is omitted.

As illustrated in FIGS. 15A to 15C, it is also possible to employ phosphor wheel 413 in which each of blade parts 433a is provided on the same side as the side provided with each of blade parts 433b, which are disposed so as to extend obliquely with respect to radial directions.

Figure 16A:
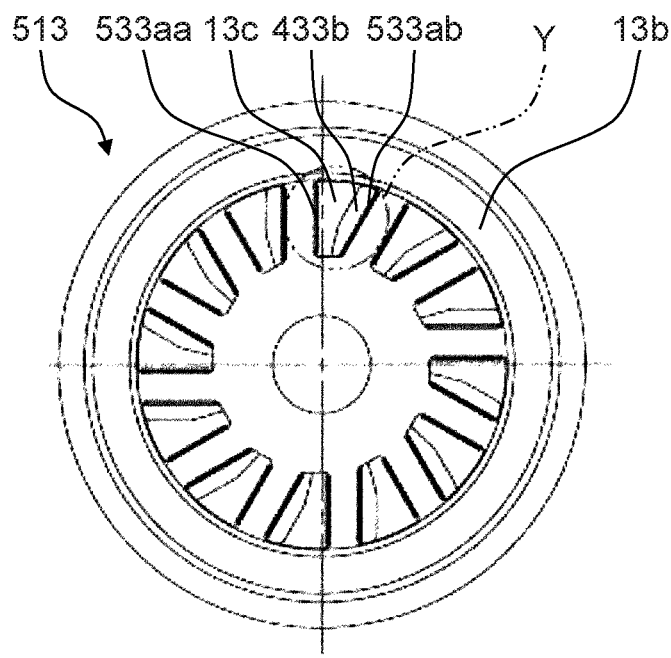
FIG. 16A is a plan view illustrating a configuration of a phosphor wheel according to yet further another exemplary embodiment of the present disclosure.
Figure 16B:
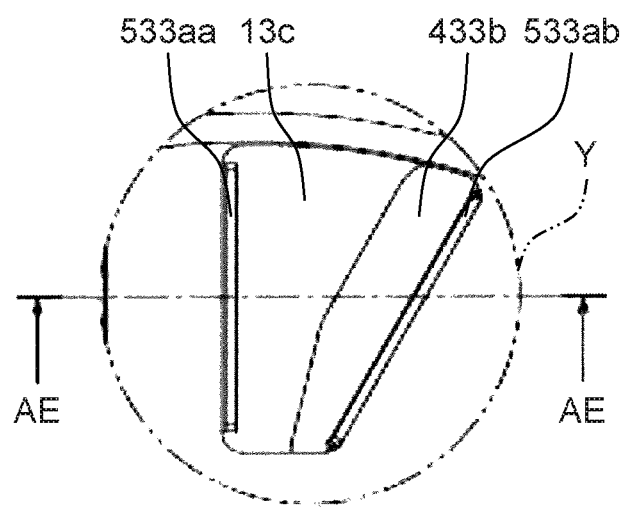
FIG. 16B is an enlarged view illustrating a main part of FIG. 16A.
Figure 16C:
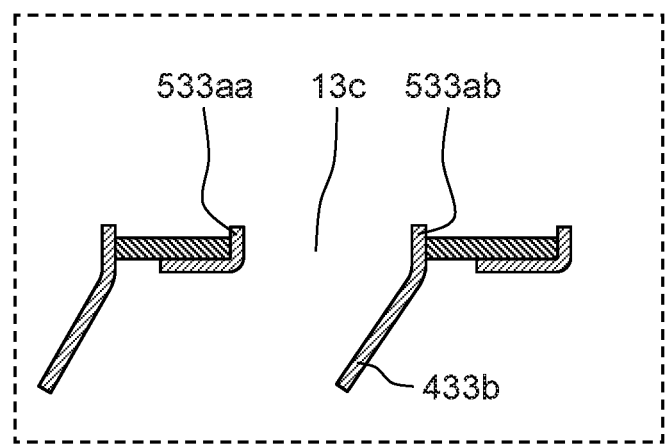
FIG. 16C is a cross-sectional view illustrating a main part of FIG. 16B.

FIG. 16A is a plan view illustrating a configuration of a phosphor wheel according to yet further another exemplary embodiment of the present disclosure. FIG. 16B is an enlarged view illustrating a main part of FIG. 16A. Note that FIG. 16B is an enlarged view of main part Y of FIG. 16A. FIG. 16C is a cross-sectional view illustrating a main part of FIG. 16B. Note that FIG. 16C is a cross-sectional view taken along line AE-AE in FIG. 16B, in which some part of the configuration is omitted.

As illustrated in FIGS. 16A to 16C, it is also possible to employ phosphor wheel 513 including blade parts 533aa and blade parts 533ab. Each of blade parts 533aa are provided on the opposite side to the side provided with each of blade parts 433b extending obliquely with respect to radial directions, while each of blade parts 533ab is provided on the same side.

(C)

The foregoing exemplary embodiment has described an example in which pressure fan 15 is provided in a space below phosphor wheel 13, as illustrated in FIG. 5 and so forth, in order to efficiently circulate the airstream produced by blade parts 33a and 33b within case unit 11. However, the present disclosure is not limited thereto.

For example, it is also possible that the phosphor wheel device and the light conversion unit may not include a pressure fan in the case unit.

In this case, the air that carries the heat produced in the phosphor layer may be cooled in the heat absorber by the airstream produced by the blade parts provided on the phosphor wheel.

Nevertheless, in order to efficiently circulate the airstream that passes through the heat absorber, the wind force produced by the blade parts alone may be too weak. For this reason, when the heat absorber has a fin structure with a great pressure loss, for example, it is more preferable to provide pressure fan 15 that blows air in the same direction as the direction of the airstream produced by blade parts 33b.

(D)

The foregoing exemplary embodiment has described an example in which airstream ascending guide 11e for guiding airstream upward is provided in a space below phosphor wheel 13 within case unit 11 and on an upper surface of bottom part 11d, as illustrated in FIG. 5. However, the present disclosure is not limited thereto.

For example, the phosphor wheel device and the light conversion unit may not be provided with the airstream ascending guide.

In such cases, because the force that causes the airstream that has passed through the heat absorber to ascend is dependent only on the wind force produced by blade parts 33a, it may be difficult to circulate the airstream sufficiently.

For this reason, it is also possible to provide pressure fan 15 that blows air in the same direction as the direction of the airstream produced by blade parts 33b, as in the foregoing exemplary embodiment. This enables the airstream to circulate sufficiently within case unit 11, even with the configuration that does not include the airstream ascending guide.

(E)

The foregoing exemplary embodiments have described examples in which heat produced in phosphor layer 13b of phosphor wheel 13 is absorbed in heat absorber 21 using the air as a medium and thereafter the heat is discharged outside through heat dissipator 22, which is thermally connected with heat absorber 21 via heat pipe 24, as illustrated in FIG. 2, for example. However, the present disclosure is not limited thereto.

For example, it is also possible to provide outer wall fins on an external surface of the case unit, which encloses the phosphor wheel device and the light conversion unit, so that the heat produced in the phosphor layer of the phosphor wheel can be released via the outer wall fins.

This configuration is able to provide the heat releasing function from the outer wall fins of the case unit in addition to the heat dissipating function of the heat dissipator. Therefore, it is possible to dissipate the heat produced in the phosphor layer portion to outside more efficiently.

(F)

The foregoing exemplary embodiments have described examples in which heat produced in phosphor layer 13b of phosphor wheel 13 is discharged outside by heat absorber 21 and heat dissipator 22, which are thermally connected with each other via heat pipe 24. However, the present disclosure is not limited thereto.

For example, it is also possible to employ a light conversion unit in which the heat absorber and the heat dissipator are directly connected with each other to eliminate the heat pipe.

In this case as well, the heat absorber and the heat dissipator are thermally connected with each other through the separating wall of the case unit. Therefore, the heat produced in the phosphor layer of the phosphor wheel can be discharged outside through the heat absorber and the heat dissipator while circulating air with the blade parts.

(G)

The foregoing exemplary embodiment has described an example in which phosphor wheel 13, phosphor wheel device 10, and light conversion unit 20 according to the present disclosure are incorporated in 3-chip DLP projector 100, which includes three DMDs 7. However, the present disclosure is not limited thereto.

For example, it is also possible that phosphor wheel device 10 and light conversion unit 20 according to the present disclosure may be incorporated in a 1-chip DLP projector, which includes a single DMD and a color wheel in combination.

(H)

The foregoing exemplary embodiments have described examples in which phosphor wheel device 10 and light conversion unit 20 according to the present disclosure are incorporated in DLP-type projector 100. However, the present disclosure is not limited thereto.

For example, it is also possible that phosphor wheel device 10 and light conversion unit 20 of the present disclosure may be incorporated in a liquid crystal-type projector, which uses a liquid crystal display (LCD) or a liquid crystal on silicon (LCOS) display.

(I)

The foregoing exemplary embodiments have described projector 100 as an example of the projection display apparatus according to the present disclosure. However, the present disclosure is not limited thereto.

For example, it is also possible to apply the configuration of the present disclosure to other types of projection display apparatus other than the projector, such as rear projection television sets.

INDUSTRIAL APPLICABILITY

The phosphor wheel according to the present disclosure is able to obtain an improved cooling effect over conventional phosphor wheels, and is therefore applicable widely to phosphor wheel devices, light conversion units, and projection display apparatus that incorporate a phosphor wheel that produces an increased amount of heat produced in a phosphor in association with increased brightness.

REFERENCE MARKS IN THE DRAWINGS 2a, 2b blue LD (light source)
3a separating mirror (optical component)
3b, 3c mirror (optical component)
3d dichroic mirror (optical component)
3e, 3f, 3g mirror (optical component)
4a to 4h lens (optical component)
5 rod integrator (optical component)
6a total internal reflection (TIR)prism (optical component)
6b color prism (optical component)
7 DMD (display element)
8 projection lens
10 phosphor wheel device
11 case
11a lid part
11aa opening
11b outer cylinder part
11c inner cylinder part
11d bottom part
11e airstream ascending guide
13 phosphor wheel
13a substrate
13b phosphor layer
13c opening
14 motor
15 pressure fan
20 light conversion unit
21 heat absorber
21a fin
21b stationary wall
22 heat dissipator
22a fin
23 optical lens
23a optical lens retaining part
24 heat pipe
33 disk-shaped member
33a blade part (first blade part)
33b blade part (second blade part)

33c center hole
100 projector (projection display apparatus)
113 phosphor wheel
133a blade part
213 phosphor wheel
233a blade part
313 phosphor wheel
333aa, 333ab blade part
413 phosphor wheel
433a, 433b blade part
513 phosphor wheel
533aa, 533ab blade part

The invention claimed is:

1. A phosphor wheel comprising:
a first surface having a disk shape;
a second surface opposite the first surface;
a phosphor layer having an annular shape and being provided on the first surface;
a plurality of openings disposed radially inward of the annular-shaped phosphor layer and arrayed along a circumferential direction;
a plurality of first blade parts located respectively adjacent to the plurality of openings in the first surface, the plurality of first blade parts configured to blow air to a surface of the phosphor layer; and
a plurality of second blade parts located respectively adjacent to the plurality of openings in the second surface, the plurality of second blade parts configured to blow air toward the first surface on which the phosphor layer is provided.

2. The phosphor wheel according to claim 1, wherein each of the second blade parts extends radially across the circumferential direction.

3. The phosphor wheel according to claim 1, wherein each of the first blade parts and each of the second blade parts are formed as part of a common member.

4. The phosphor wheel according to claim 1, wherein each of the first blade parts extends radially across the circumferential direction.

5. The phosphor wheel according to claim 1, wherein the plurality of first blade parts are formed by incising and erecting portions of a single plate-shaped member.

6. A phosphor wheel device comprising:
the phosphor wheel according to claim 1;
a motor configured to drive the phosphor wheel to rotate; and
a case unit enclosing the phosphor wheel and the motor, and including a circulation passage of airstream produced by the first blade parts or the second blade parts.

7. A light conversion unit comprising:
the phosphor wheel device according to claim 6;
a heat absorber configured to absorb heat produced in a vicinity of the phosphor layer of the phosphor wheel;
a heat dissipator thermally connected with the heat absorber and configured to dissipate heat of the airstream out of the case unit; and
an optical lens attached to an opening formed in the case unit, the optical lens configured to transmit excitation light that excites a phosphor in the phosphor layer and to condense emission light emitted from the phosphor in the phosphor layer.

8. The light conversion unit according to claim 7, wherein the first blade parts are disposed proximate to and in a face-to-face relationship with the optical lens.

9. A projection display apparatus comprising:
the light conversion unit according to claim 7;
a light source emitting light that excites a phosphor in the phosphor layer;
a display element configured to form a projection image by using the light emitted from the light source; and
an optical component optically connecting the light source, the light conversion unit, and the display element.

10. A phosphor wheel comprising:
a first surface having a disk shape;
a second surface opposite the first surface;
a phosphor layer having an annular shape and being provided on the first surface;
a plurality of openings disposed radially inward of the annular-shaped phosphor layer and arrayed along a circumferential direction; and
a plurality of first blade parts located respectively adjacent to the plurality of openings in the first surface, the plurality of first blade parts configured to blow air to a surface of the phosphor layer;
wherein at least two of the plurality of first blade parts are provided for a corresponding one of the openings.

* * * * *